United States Patent
Kelderman et al.

(10) Patent No.: US 6,471,758 B1
(45) Date of Patent: Oct. 29, 2002

(54) INK COMPOSITION FOR A MELTABLE INK AND A METHOD OF PRINTING A SUBSTRATE WITH SUCH AN INK COMPOSITION

(75) Inventors: Erik Kelderman, Venlo; Marcus Petrus Leonardus Huinck, Herten; Nicolina Margriet Kortenhoeven, Venlo; Frederik Leonardus Everardus Marie Suilen, Swalmen; Guido Gerardus Willems, Venlo; Albin Bernhard Werner Haas, Roermond, all of (NL)

(73) Assignee: Oce Technologies B.V., Venlo (NL)

( * ) Notice: Subject to any disclaimer, the term of this patent is extended or adjusted under 35 U.S.C. 154(b) by 26 days.

(21) Appl. No.: 09/612,096

(22) Filed: Jul. 7, 2000

(30) Foreign Application Priority Data

Jul. 9, 1999 (NL) .............................................. 1012549

(51) Int. Cl.$^7$ .............................................. C09D 11/02
(52) U.S. Cl. ................................ 106/31.29; 106/31.61; 106/31.58; 106/31.86
(58) Field of Search ........................... 106/31.29, 31.61, 106/31.58, 31.86

(56) References Cited

U.S. PATENT DOCUMENTS

| 5,021,802 | A | * | 6/1991 | Allred ..................... 106/31.36 |
| 5,100,468 | A | * | 3/1992 | Yuasa et al. ............. 106/31.86 |
| 5,178,672 | A | * | 1/1993 | Miller ........................ 106/252 |
| 5,439,515 | A | * | 8/1995 | Kurabayashi et al. .... 106/31.37 |
| 5,462,591 | A | * | 10/1995 | Karandikar et al. ..... 106/31.36 |
| 5,531,817 | A | * | 7/1996 | Shields et al. ........... 106/31.38 |
| 5,973,036 | A | * | 10/1999 | Yoshimura et al. ......... 524/186 |
| 5,989,325 | A | * | 11/1999 | Sacripante et al. ...... 106/31.27 |

* cited by examiner

Primary Examiner—Helene Klemanski
Assistant Examiner—Veronica F. Faison
(74) Attorney, Agent, or Firm—Birch, Stewart, Kolasch & Birch, LLP

(57) ABSTRACT

An ink composition for a meltable ink usable in a printing device in which ink drops are ejected from ink ducts, which comprises agents which reversibly cross-link the ink, the said agents containing a gelling agent. When an ink drop which has been transferred to a substrate passes over into a gel during the cooling process, the consequence is that the viscosity of the melted ink drop increases greatly so that the drops become relatively immobile. In this way the ink drops are prevented from uncontrollably flowing into the paper. As a result, inks of this kind are suitable for use on both porous and smooth substrates. In addition, these inks have been found suitable for use in a printing device in which printed substrates are subjected to thermal after-treatment.

15 Claims, 6 Drawing Sheets

25°C     30°C     34°C     38°C     43°C beeld 1    beeld 2 ref. 25°C    10 sec, 60°C    30 sec, 60°C

INK COMPOSITION FOR A MELTABLE INK AND A METHOD OF PRINTING A SUBSTRATE WITH SUCH AN INK COMPOSITION

BACKGROUND OF THE INVENTION

The present invention relates to an ink composition for a meltable ink usable in a printing device in which ink drops are ejected from ink ducts. The present invention comprises an agent which reversibly cross-links the fluid ink. The present invention also relates to a method of printing a substrate with such an ink composition.

Inks of this kind, which are solid at room temperature and liquid at an elevated temperature are known from U.S. Pat. No. 5,380,769. These inks are reactive compositions which contain at least two components, i.e. a basic ink component and a reagent, the components being transferred to a receiving medium separately from one another. Exposure of the basic ink component to the reagent results in the formation of polymers which form a network in the fluid ink by means of reversible bonds.

An important disadvantage of an ink composition of this kind is that it consists of two separate components which have to be transferred successively to a receiving medium. This makes the printing device complex and the production and processing of the ink expensive.

SUMMARY OF THE INVENTION

The object of the present invention is to obviate these disadvantages. To this end, an ink composition has been invented in which the agent which reversibly cross-links the fluid ink comprises a gelling agent. A gelling agent is capable, as such, to thicken a liquid by forming a three-dimensional structure therein. The liquid thus passes over into the form of a gel. A gelling agent can consist, inter alia, of high and low molecular compounds, a mixture of compounds, or of discrete particles. The molecules or particles of the gelling agent so interact with one another in the gel that a network is formed in the liquid. During this network formation, it is not necessary for the molecules or particles of which the gelling agent consists to be actually chemically bonded or have physical contact. All that is required is that they should have a physical interaction such as to result in a reinforcing effect in the liquid. As a result the viscosity of the liquid increases without it passing over into a solid phase.

Typical gelling agents are high-molecular, elongated molecules which form an elastic network in a medium, the interstices of the network being filled with the medium which can be in a liquid or a solid state. If the medium in the interstices is in a liquid state, a gel arises which has some fluid-like properties, such as the property that molecules can diffuse relatively easily into the continuous liquid matrix and some solid-like properties such as the property that the gel can withstand a certain shear stress without deformation occurring, before the gel starts to flow like a liquid. When the liquid in the interstices of the network solidifies, the gel passes over to the solid state.

The ink composition is preferably a gel at a temperature equal to or higher than room temperature. In this way a network can be formed by a printing ink on a receiving medium at ambient or elevated temperatures. In another preferred embodiment, the ink composition is a gel at a first temperature and a sol at a second temperature higher than the first temperature. A sol is a low viscosity, homogeneous liquid, which may contain colloidal particles. The ink is cross-linked in such a fashion that the links are broken when the temperature is elevated above the second temperature, also called the gel-transition temperature. This is a very important advantage for the inks of the present invention because in this way it can be assured that the inks have a low viscosity at the jetting temperature. A low viscosity ameliorates the jetting characteristics of an ink jet ink.

The use of gelling agents is of course known from liquid inks (aqueous and solvent inks), but these gelling agents cannot be directly used in a meltable ink. It is in fact impossible to select a molecule or particle that can cause a liquid to pass over into a gel. Whether a specific compound has the property of being able to cause a liquid to pass over into the form of a gel also depends on the properties of the liquid. Moreover, in the case of meltable inks it is difficult, accurately, to co-ordinate the different solubilities of the different components in such a manner as to form a homogenous melt at the temperature at which ink drops are ejected from the ink ducts, and a specific solidification and crystallisation behaviour is exhibited on cooling of the melted ink. This makes the development of meltable inks very complex.

Known gelling agents such as carragenan, laminarane, pectin and gums such as gum arabic, xanthane and guar gums, are high-molecular polymers. Since meltable inks of themselves are already more viscous than liquid inks at the temperature at which the ink drops are ejected from the ink ducts, the addition of a small quantity of such high-molecular gelling agents can lead to an unacceptably high viscosity in the melted state. This means that there is an adverse effect on the jet properties of the ink. Oligomer gelling agents, i.e. gelling agents with a molecular weight of less than 10,000, which are less common are therefore preferably used, so that a higher percentage of gelling agent can be added to the ink composition without having an adverse effect on the melt viscosity of the ink composition. In a further preferred embodiment, low-molecular gelling agents are used, i.e. gelling agents with a molecular weight of less than 1,000.

The fact that oligomers and low-molecular weight compounds can have gelling properties despite their relatively low molecular weight can be explained as follows. In the case of oligomers and low-molecular gelling agents, the molecules separate from the melted ink on an adequate reduction of the temperature, and form long compound chains via mutual non-covalent interactions, said chains behaving in accordance with the high-molecular polymers in the previously mentioned gelling agents. The compound chains can form a network which causes the melted ink composition to pass over into a gel. Since the molecules of the gelling agent form a network structure, concentrations of the gelling agent as low as 25% can be sufficient to gel the liquid ink composition. When the gel is heated up, the interactions between the molecules of the gelling agent are interrupted and a sol re-forms. A supplementary advantage of the use of oligomers and low molecular weight gelling agents is that the gel-sol transition takes place relatively quickly. Because of this transition, it is only necessary to break the relatively weak non-covalent bonds between the compound molecules of the polymer chains. In addition, small molecules will be mixed homogeneously in the melted ink matrix more rapidly. This is an important advantage because a meltable ink frequently has to be brought into the melted state quickly, e.g. when the printing machine is started up and the user wants to print an image immediately. For use in a hot melt ink, a gelling agent is preferably used which has amphiphilic properties, i.e. partly polar and partly apolar properties. An example is a gelling agent with a straight alkane backbone and some additional polar groups. Because of the amphiphilic properties the combining of the gelling agent with various hot melt ink compositions is simplified. Gelling agents having an optimal function according to the present invention only need to be present in a quantity of less than 10% based on the total weight of the ink composition. Finding such gelling agents is difficult but has the advantage that no adverse effects on the viscosity of the melted ink and other physical properties, such as the melt-temperature and the adhesive and mechanical properties of the solidified ink, nor the solubility properties of the liquid ink are expected as a result. In a further preferred embodiment, the gelling agent constitutes less than 5% of the total ink composition.

To ensure that the ink does not gel when it is situated in an in duct prior to the ejection of an ink duct from said duct, the ink is preferably a low-viscosity sol at the temperature at which the ink drops are ejected from the ink ducts (the "temperature of use", typically 60° C. to 160° C.) and a gel at a lower temperature differing by at least 10° C. from the temperature of use. To prevent an ink drop from gelling too quickly when it cools on a substrate, which could result in poor adhesion to the substrate, the temperature at which the ink composition passes from a sol to a gel is preferably at least 20° C. different from the temperature of use. After the ink has gelled on a substrate, it will cool further, and finally the meltable fraction of the ink composition situated in the interstitial space of the network will pass over to the solid state. In this way an ink drop obtains the strength required to offer sufficient resistance to mechanical deformation resulting, for example, from gumming, scratching and folding of the substrate.

U.S. Pat. No. 5,902,841 discloses hot melt ink jet inks which contain hydroxy-functional fatty-acids. These inks transfer into a metastable gel-phase when cooled from a liquid phase at elevated temperatures to a solid phase at ambient temperatures. However, the metastable gel-phase is a solid state gel in which the interstices of the network are filled with solidified ink.

In U.S. Pat. No. 5,989,325, published after the priority date of the present application, a non-aqueous ink composition comprising a hydrophobic gelling agent is disclosed. This ink composition also transfers from a liquid state at elevated temperatures to a solid, gelled state at lower temperatures.

Therefore, these inks differ from the ink composition of the present invention which relates to the gelling or cross-linking of an ink in a fluid state.

A meltable ink composition containing a gelling agent has a number of surprising advantages compared with the known meltable inks. The most important advantage is that an ink composition according to the present invention gives very good printed results on porous substrates such as paper. Even in the case of relatively hot substrates there is no unacceptable running of the ink drops, which might result in printed lines becoming unsharp ("feathering"), colors running into one another ("color bleed") or ink at the back of the substrate ("bleeding"). If the ink already passes over into the gel state at a relatively high temperature during the cooling process, this has the result that the drops become relatively immobile because of the increased viscosity. This prevents the ink drops from flowing uncontrollably into the paper. It is essential however that the ink, in spite of its gelled state, still has sufficient fluid-like properties. These properties are present since the ink in the interstices of the network is still in a melted, fluid state. This way, a gelled ink drop can readily penetrate in the paper in order to prevent setting of the ink on the upper surface of the paper.

Inks without gelling agents continue to behave as a liquid for as long as the temperature of a drop is above the solidification point. In the case of hot substrates in particular, ink drops frequently cool too slowly. As a result, ink drops with known ink compositions remain fluid for too long so that a printed pattern loses its sharpness. In the known inks, this is prevented, inter alia, by selecting an ink composition with a higher solidification point. However, a composition of this kind has several disadvantages. Firstly, a higher solidification point normally goes together with a higher melting point, so that a printing device has to be heated to a higher temperature, and this subjects the printing device construction to much more stringent requirements. Secondly, an ink drop with a higher solidification point tends to set on the upper surface of a receiving medium. In this way the ink dot cannot withstand mechanical impact and will, for example, be subjected to smearing, a phenomenon that is very common in conjunction with hot melt inks.

A concomitant advantage of an ink composition according to the present invention is that the running of the ink drops is no longer dependent on the solidification behaviour of the other components present in the ink composition. In an ink composition according to the present invention, running is determined by the temperature at which the ink passes over into the gel state and not by the temperature at which the ink passes over to the solid state (for example, because a crystalline or amorphous component in the ink composition solidifies). This means that the other materials forming part of the ink composition can be selected from materials which solidify more slowly or more quickly without this having a perceptible adverse effect on the running of the ink drops. A slower solidification may be desired, for example, in order to give an ink a stronger interaction with the sizings of a substrate. A faster solidification may be desired to give the printed substrate the required resistance to gumming, scratching and folding sooner. The network of gelling agent molecules can also serve as a seed for the solidification of the other materials. If, for example, a crystalline material is selected as an important constituent of an ink composition, the addition of a gelling agent can result in a more microcrystalline matrix which delivers smooth matt-gloss prints. With such an ink it is possible to use a less pure crystalline material or to add more amorphous material to the ink composition, for example, to increase the dissolving power for dyes, if the crystallization of the crystalline material in the ink matrix is sufficiently stimulated. A faster crystallization of an ink constituent could be advantageous because than the ink composition becomes hard relatively soon after cooling of the ink composition to room temperature. This is not only advantageous in the printing of substrates (printed substrates will be resistant against mechanical impact, such as gumming, scratching and folding, relatively soon after printing), but also advantageous in the manufacturing of ink pills out of molten ink (pills solidying in molds will become sufficiently hard relatively fast so that they can be released from their molds are a short while to be handled further). Finally, by enhancing crystallization a disturbing after- or re-crystallization, which could become visible as a white haze in a printed image, can be prevented.

It is possible to apply a mixture of gelling agents in an ink composition. This way the gel-forming process can be adjusted precisely and next to that, the solidifying of the other ink constituents, in particular the crystallization of a crystalline constituent can be stimulated in any desired way.

With pigmented inks it has been found that the use of a gelling agent gives a better distribution of the pigment, so that printed layers of such an ink are more uniform than if no gelling agent is used.

Moreover, the use of a gelling agent has also been found to provide advantages when smooth non-porous substances are used as a medium. Coagulation of ink drops printed in each other's vicinity has been found to be greatly suppressed. This phenomenon is probably also related to the reduced mobility of gelled ink drops.

A concomitant advantage of an ink composition occurs when the ink is used for multi-layer prints, as is conventional with four-color printing. Ideally, a following drop is printed on a preceding drop when the preceding drop has not yet completely solidified. This results in good adhesion and color mixing. This means that inks are preferably selected which remain fluid on a substrate for a fairly long time. However, if ink drops remain fluid too long, unwanted running occurs, so that printed images become unsharp. By using an ink composition according to the present invention it is possible to prevent unwanted running of an ink drop that has not yet set, and yet good adhesion occurs with a following ink drop. Thus, a gelled ink drop behaves like a fluid ink drop in so far as adhesion and color mixing is concerned, but does not suffer from adverse feathering.

Finally, it has been found that an ink composition according to the present invention is very suitable for a printing device provided with an after-treatment device, particularly when the after-treatment is combined with heat transfer to the ink drops: what is known as thermal after-treatment. If printed layers of known inks are after-treated in order to give the ink drops better interaction with the paper, e.g. to obtain better gumming, scratching and folding resistance, or in order to improve the uniformity of the printed image, for example to provide a more uniform gloss, this quickly results in unwanted running of the ink because the ink frequently has to be heated to above its melting point and thus, because of the lower viscosity, can enter the paper uncontrollably. When an ink composition according to the invention is used in combination with an after-treatment device, the temperature of the ink drops being increased so that they pass over from the solid state to a gelled state, it has been found that the gumming, scratch and folding resistance of the treated substrates increases greatly without accompanying uncontrolled running of the ink. Thus, a gelled ink drop has sufficient fluid properties in order to migrate into a substrate further, but the cohesion in the ink drop is so great that uncontrolled running of the ink drop is prevented.

The present invention will now be explained in detail with reference to the following Tables and Figures.

Table 1 gives a selection of gelling agents.

Table 2 gives a selection of crystalline materials.

Table 3a gives a summary of a number of amorphous, monomer and oligomer materials.

Table 3b gives a selection of commercially available oligomer and polymer materials.

Table 4 shows the meltable fraction of a number of ink compositions according to the present invention.

Table 5 gives a selection of ink compositions according to the present invention.

Table 6 gives a number of ink compositions for comparison.

Table 7 gives the effect of a gelling agent on the spreading of an ink drop on a substrate.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Table 1

Figure 1:
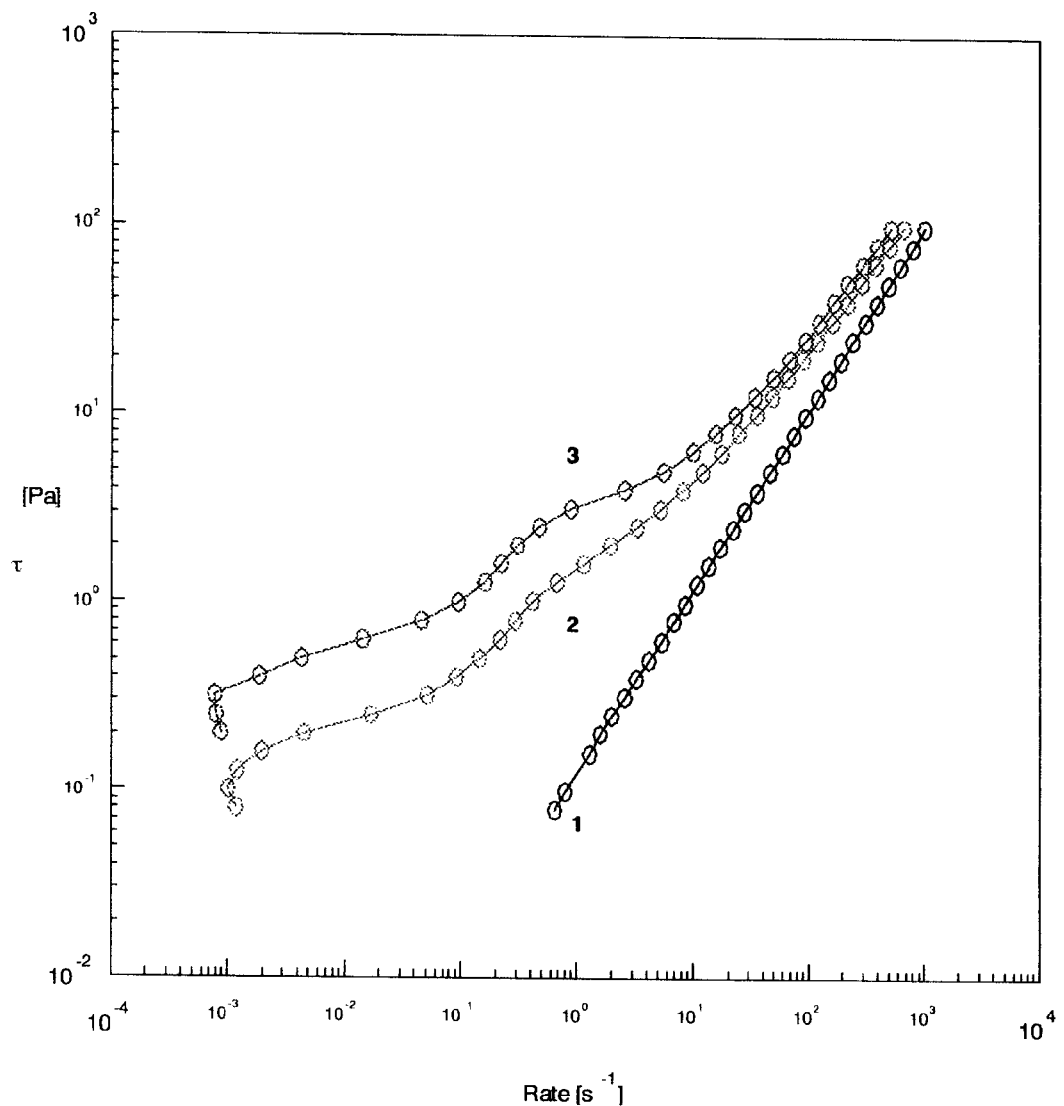
FIG. 1 shows how the shear stress of an ink composition with and without a gelling agent depends on the applied shearing rate.

Table 1 gives a selection of gelling agents suitable for use in an ink composition according to the present invention. The Table starts with practically aliphatic substantially non-polar gelling agents and ends with gelling agents which give rise to strong polar interactions.

Table 2

Table 2 gives a selection of crystalline materials which can be used in an ink composition according to the present invention. Part A of the Table gives a number of crystalline bis-urethanes, in this case the reaction products of hexamethylene diisocyanate (HMDI) and respectively methyl ethylene glycol (MEG), ethyl ethylene glycol (EEG), hexanol (HA) and phenyl ethyl alcohol (PEA). Table B gives a number of sulphonamides, namely, para-toluene sulphonamide, a 40/60 mixture of ortho and para-toluene sulphonamide, para-ethyl benzene sulphonamide and a mixture of para-toluene sulphonamide and para-ethyl benzene sulphonamide and para-n-butyl benzene sulphonamide. Part C gives data on a number of (di)-alcohols. Other compounds suitable for use in an ink composition according to the present invention are shown in part D of the Table.

Table 3a

Table 3a gives a selection of amorphous monomer and oligomer materials which can be used in an ink composition according to the present invention. Part A of this Table gives compounds of pentaerythritol: compound I is pentaerythritol tetrabenzoate, compounds 2, 3 and 4 are respectively the ortho, meta and para toluate ester, and compound 5 is a statistical synthetic mixture of the meta and para toluate compounds, 6 is the tetra-anisilate compound. Compounds 9 to 12 shown in part B of the Table are partly analogous di-pentaerythritol compounds. Compound 12 is the hexa-carbonate compound of di-pentaerythritol.

Part C of Table 3a gives compounds of isophorone diisocyanate with an aliphatic alcohol (e.g. isopropyl alcohol, methyl alcohol, ethyl alcohol) or aromatic alcohol (e.g. benzyl alcohol).

The compounds of 4,4' dicyclohexylmethane diisocyanate with an alcohol (benzyl alcohol and phenyl ethyl alcohol) are shown in part D of Table 3a.

Part E of this Table gives data on a number of other bis-urethanes on the basis of diphenylmethane diisocyanate and an alcohol.

Part F shows the data concerning a number of reaction products of the diglycidyl ether of bis-phenol A with, respectively, para-phenol (21), para-cyclohexyl phenol (22), para-tert-amyl phenol (23) and para-tert-butyl phenol (24).

Part G of the Table shows compounds derived from 2,2'-biphenol. Respectively the esters of biphenol with methoxybenzoic acid (25), ortho-, meta- and paramethylbenzoic acid (26, 27, 28) and the phenyl carbonate of biphenol (29).

Part H gives urethanes derived from propoxylated glycerol and cyclohexyl isocyanate (30). It relates to a mixture of substances which has a specific glass transition temperature depending on the average value of x. When x is approximately equal to 1, this temperature is 17° C.

Part I shows urethanes derived from pentaerythritol and cyclohexyl-isocyanate (31). When x is on average approximately equal to 1, a mixture of urethanes of this kind has a glass transition temperature of 23° C.

Part J gives a mixture of urethanes on the basis of di-trimethylolpropane and 50 mole equivalents cyclohexyl isocyanate (32). Finally, part K gives the compound N,N'-bis-(benzoyl)-2-methyl-1,5-diaminopentane (33).

Table 3b

This Table gives a selection of commercially available amorphous oligomer and polymer materials which can be used in an ink composition according to the present invention.

Table 4

Table 4 shows the meltable fraction of a number of compositions of inks according to the present invention. The meltable fraction of these inks contains a gelling agent, a crystalline material as the main component to make the inks sufficiently hard, and an amorphous material to make the inks sufficiently flexible so that printed ink layers have sufficient resistance to mechanical stresses such as gumming, scratching and folding of the substrate. There are also other combinations and quantities possible in respect of crystalline and amorphous materials in order to give inks the required mechanical properties. For example, it is known to build up the meltable fraction of the inks practically entirely from waxes but it is also possible to select just amorphous materials. The meltable fraction of an ink can also be built up from a combination of a number of amorphous materials, which may or may not be supplemented with one or more crystalline materials. The Table gives the percentages by weight of the various components present in the ink compositions.

For practical use, one or more coloring agents, such as pigments or dyes, are added to a meltable mixture. In addition, the usual additives can be added to each of the inks, e.g. antioxidants, corrosion inhibitors where necessary, compounds which improve the mutual solubilities of the components, adhesion improves, wetting agents, surfactants, dispersants, and so on. All this depends, inter alia, on the required properties of the ink in the liquid and solid state, the type of printing device, the printing rate, the type of substrate, and the required mechanical properties of the ink.

Table 5

Table 5 gives three ink compositions I, II and III according to the present invention. Each of these ink compositions contains a crystalline material (K), an amorphous material (A) and a gelling agent (G). The ink compositions are provided with a dye (KI), Macrolex Rot (Bayer) in the case of the ink compositions I and III, Orasol Blau (Ciba-Geigy) in the case of composition II. In addition, the three ink compositions are provided with wetting agent (V) BYK 307 (Byk Chemie).

Table 6

For comparison purposes, Table 6 gives ink compositions as in Table 5, but without the addition of a gelling agent to the ink compositions.

Table 7

Table 7 indicates, for the ink compositions I (Table 5) and I' (Table 6), the effect of adding a gelling agent to the spread of an ink drop when it is transferred to a substrate, depending on the temperature of said substrate.

The experiment took place by heating the print head of a piezo printer to 135° C. and ejecting ink drops of the associated ink composition on to a glossy paper (Océ Royal Digital Gloss) with a thickness (weight per unit area) of 135 g/m$^2$. The diameter of the ejected ink drops in this case was about 36 $\mu$m. The distance between the outflow openings and the paper was about 0.8 mm.

The paper temperature varied between 25° C. and 43° C. At each of these temperatures the diameter—in top plan view—of a solidified ink drop was measured after the experiment. This diameter was then divided by the diameter of a solidified drop on the paper at 25° C. (reference drop). The resulting figures are shown in the Table. These figures form an objective index of the running of an ink drop (feathering) as a function of the paper temperature. It is possible to see from the Table that the ink composition without the gelling agent (I') at a paper temperature equal to or greater than 38° C. has distinctly more feathering than the ink composition with the gelling agent (I). At a paper temperature of 38° C., a drop of the ink composition without the gelling agent is 1.8 times as large as the reference drop, compared with 1.5 times in the case of the ink according to the invention. At 43° C. these figures are as much as 2.3 and 1.8 times respectively.

FIG. 1

FIG. 1 shows the shear stress * (indicated on the y-axis, in pascal) required to achieve a specific shear rate (indicated in reciprocal seconds on the x-axis) for ink compositions with and without gelling properties. The measurements were carried out in a Rheometrics DSR-200 Dynamic Stress Rheometer, by exposing a melt of the relevant inks in a steady mode to a gradually increasing shear stress and measuring the associated shear rate. This drawing shows the connection for an ink composition built up from 70% HMDI-MEG as the base material (Table 2), 20% PBPA-BuP as binder material (Table 3a) with or without the gelling agent gel-23 (Table 1).

The various ink compositions were heated to 70° C., a temperature at which they are just melted. If no gelling agent is added to the above-described ink composition, the relationship found is shown by curve 1: the shear stress increases linearly with the shear rate. If 2% gelling agent is added, the relationship found is shown by curve 2. It is clear that a greater shear stress is required to achieve one and the same shear rate. This means that the liquid has become "thicker" so that more force is required to set in motion. At 4% gelling agent, shown by curve 3, an even greater shear stress is required to achieve the same shear rate. In addition, it has been found that a yield stress is introduced by the gelling agent in this ink composition. This means that a minimum shear stress is required to obtain a perceptible motion (in this case limited by a shear rate of $10^{-3}S^{-1}$) for the ink compositions provided with a gelling agent.

FIG. 2

Figure 2:
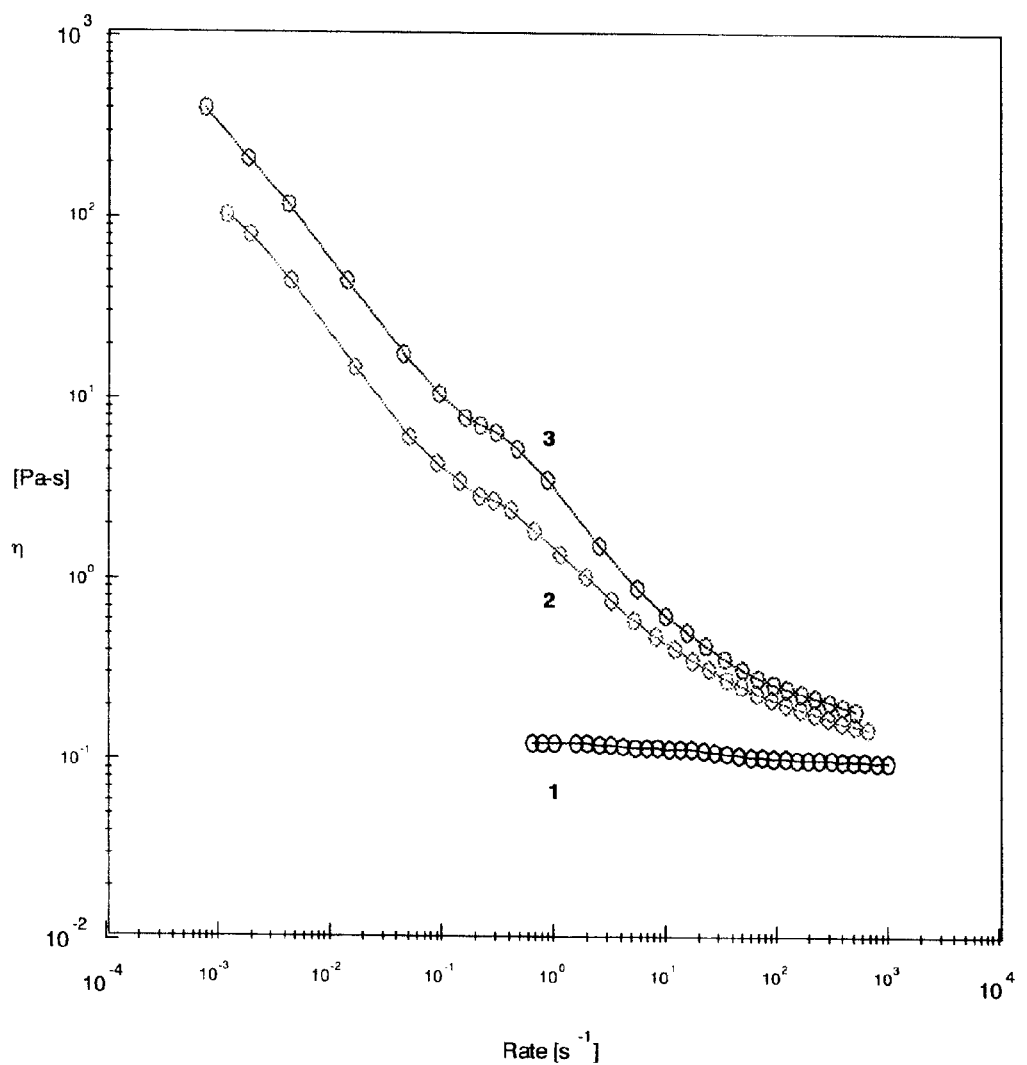
FIG. 2 is a graph showing the viscosity against the shearing rate of the ink compositions described in connection with FIG. 1.

FIG. 2 shows how the viscosity of the three ink compositions as described above in connection with FIG. 1 depends on the shear rate. The viscosity can be derived in known manner from the relationship between the shear stress and the shear rate. It is clear from the graph that the viscosities of the three ink compositions coincide approximately at high shear rates. If the temperature of the ink were increased further to above the gel transition temperature, so that the network of gelling agent molecules is broken, there is no appreciable difference in viscosity over the entire rate range. This means that the addition of a gelling agent need not have adverse effects on the jet properties of the ink composition if the ejection of the ink drops takes place above the gel transition temperature. It will be seen from the drawing that at lower shear rates the viscosity of the ink composition to which no gelling agent has been added does not increase (curve 1), and this agrees with the fact that this ink composition has completely melted at 70° C. The viscosity of the ink compositions to which 2% (curve 2), 4% (curve 3) gelling agent is respectively added, however, increases sharply with decreasing shear rate, despite the fact that the ink has not set. This means that such ink compositions behave as thicker more viscous liquids when they are practically no longer in movement. This is the case, for example, when ink drops cool on a substrate. No unwanted feathering of the ink drops occurs due to the more viscous character of the gelled ink drops. But, since the ink drops still have fluid-like properties, the ink drops can still readily penetrate into or interact with a receiving medium or sufficiently adhere to other ink drops in order to gain a good color impression.

FIG. 3

Figure 3:
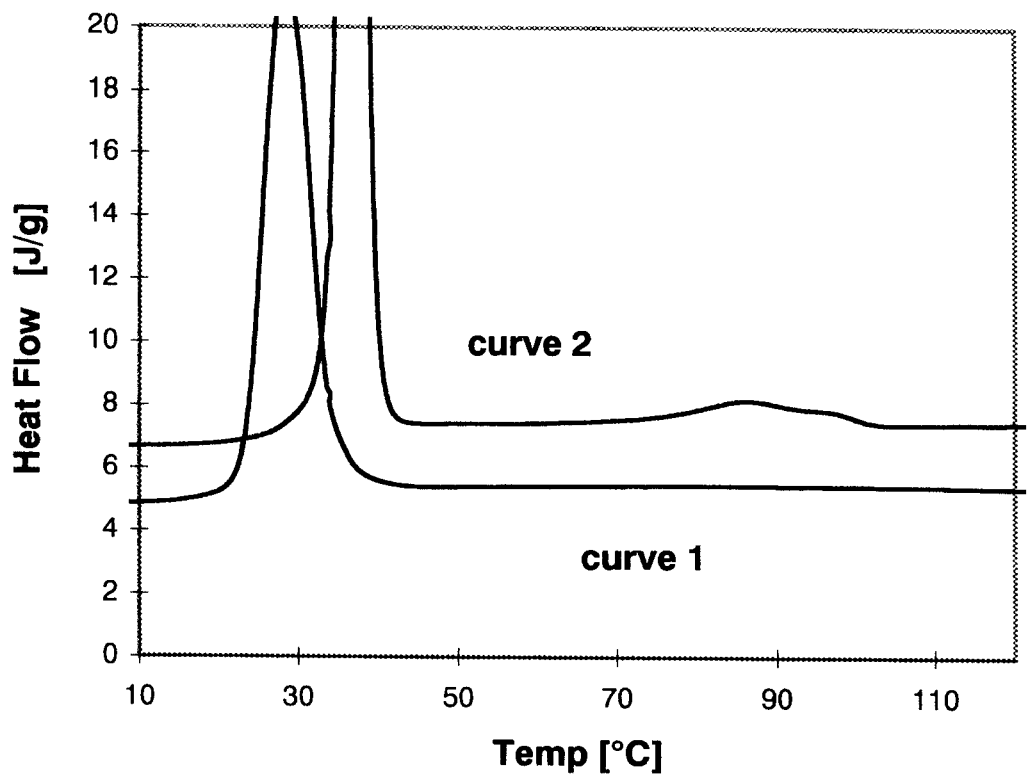
FIG. 3 is a graph showing the thermal properties of an ink composition according to the present invention and a known ink composition.

FIG. 3 is a thermogram showing the solidification behaviour of two ink compositions expressed in the enthalpy change of a composition in joules per gram, against the temperature in degrees C, recorded with a DSC. An example of a DSC measuring instrument is the Perkin Elmer DSC-7, made by Perkin Elmer Co., Norwalk, Conn. Curve 1 shows the enthalpy change of ink composition III' (Table 6) when it is cooled from 120° C. to 10° C. It will be seen from the graph that the ink undergoes a highly exothermic process at 27° C.: the ink composition solidifies at that temperature. If 4% gel-23 (Table 1) is added to this ink composition (resulting in ink composition III, Table 5), the relationship measured is as shown in curve 2. For the sake of clarity, this curve has been shifted +2 J/g with respect to the measured data. It is now found that the ink composition already undergoes a slight exothermic process at a temperature of about 90° C. At this temperature the melted ink composition passes over into the gel form. It is clear that the ink composition has not yet passed over to the solid state since the total amount of energy liberated per unit mass of ink is only a very small percentage of the amount of energy liberated when the ink composition passes over to the solid state as shown in curve 1. The ink composition provided with the gelling agent does not pass over to the solid state until 37° C. Since the solidification temperature of the ink composition is now 10° C. higher than if no gelling agent is added, it is apparent that the presence of a network of gelling agent molecules can appreciably influence the solidification of the other ink components (e.g. a crystalline material or an amorphous binder). In this case the gelling agent causes accelerated solidification of the crystalline material.

FIG. 4

Figure 4:
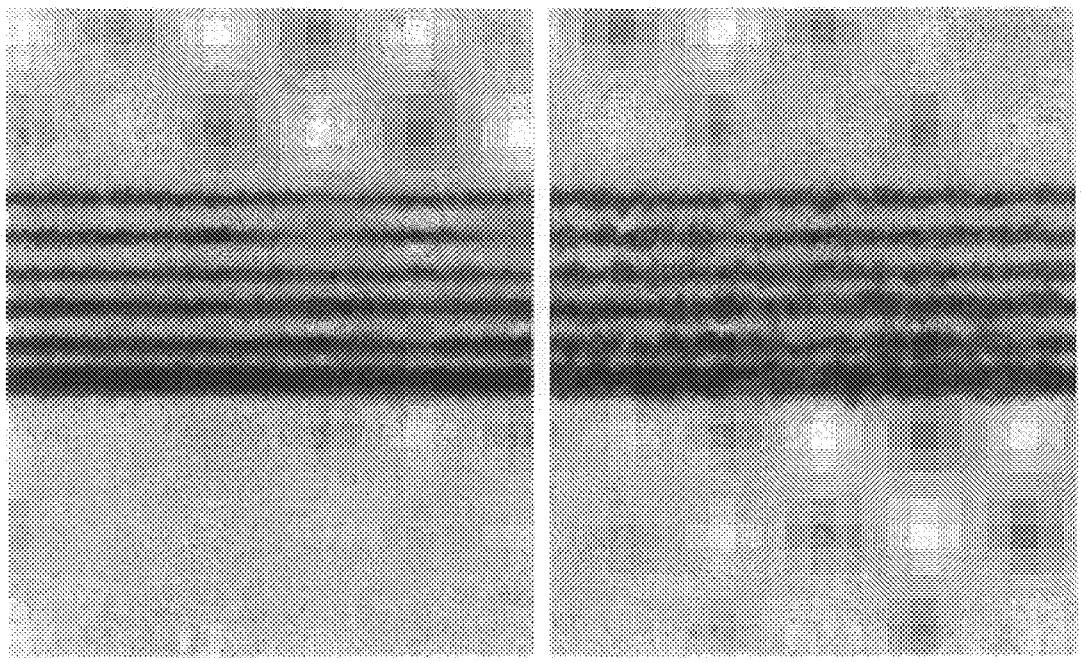
FIG. 4 shows printing results of an ink composition with and without a gelling agent.

FIG. 4 shows the printed results for the ink compositions II (Table 5) and II' (Table 6). For each composition, a line pattern was printed on paper (Océ Red Label), consisting of respectively three lines of a width of 1 pixel row (a "1-pixel" line), two lines with a width of 2 pixel rows (2-pixel line) and 1 line with a width of 5 pixel rows (5-pixel line) at a temperature of 28° C. The images were printed by heating the print head of a piezo hot melt printer to 135° C. and ejecting the ink drops in a size of 37 µm. The distance between the print head and the paper was 0.8 mm.

Image 1 is the result of printing with ink composition II, image 2 is the result of printing with the same ink without the gelling agent (ink composition II'). It is clear that the addition of the small quantity (2%) of gelling agent has an appreciable effect on the sharpness of the printed image.

FIG. 5

Figure 5:
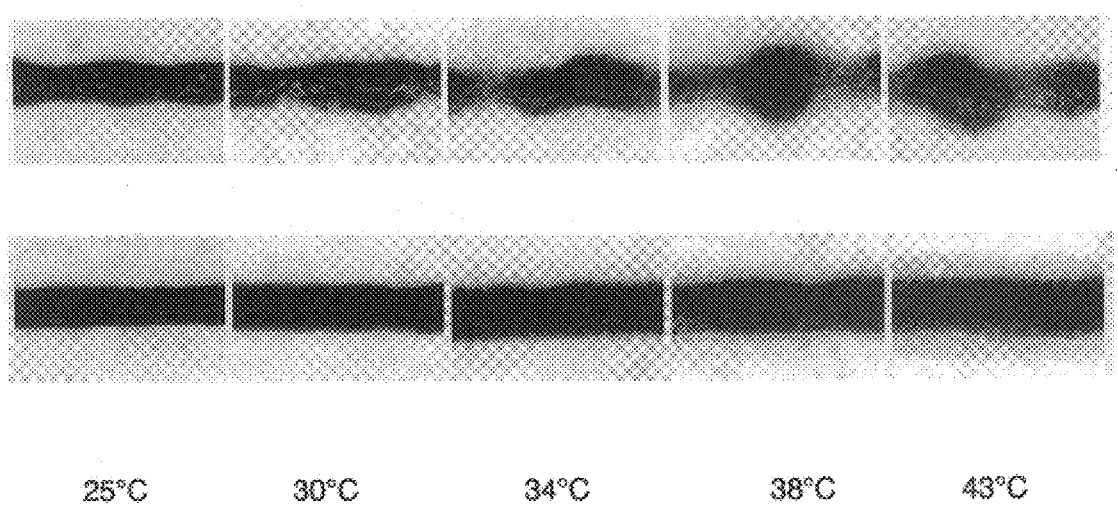
FIG. 5 shows printing results of an ink composition with and without a gelling agent at various paper temperatures.

FIG. 5 shows printed results of ink compositions I (Table 5) and I' (Table 6) against paper temperature. The ink was printed on glossy paper (Océ Royal Digital Gloss). The image relates to a line having a width of about 120 µm. To print this image, the print head of a piezo printer was heated to 135° C., whereafter ink drops of a diameter of approximately 36 µm were ejected by activating the piezo elements. The distance between the outflow openings of the print head and the paper was about 0.8 mm. The first series of five images shows the effect of increasing the paper temperature on printing the said line with an ink of composition I'. The paper temperature was increased from 25° C. for the image on the far left, via 30° C. for the second image, 34° C. for the third image and 38° C. for the fourth image to 43° C. for the fifth image. It is clear that increasing the temperature is combined with a falling off of the edge sharpness of the line, in this case because the still liquid ink drops coagulate to form larger ink drops. As a result, a printed line not only becomes wider but also has a lower optical density. In the second series the same experiment is reproduced for an ink with composition I. It is clear from the illustration that there is hardly any effect on the image when the temperature of the paper is raised from 25° C. (via 30° C., 34° C. and 38° C.) to 43° C. Evidently, when the ink cools on the substrate, it is much less mobile so that coagulation of the ink drops is prevented.

FIG. 6

Figure 6:
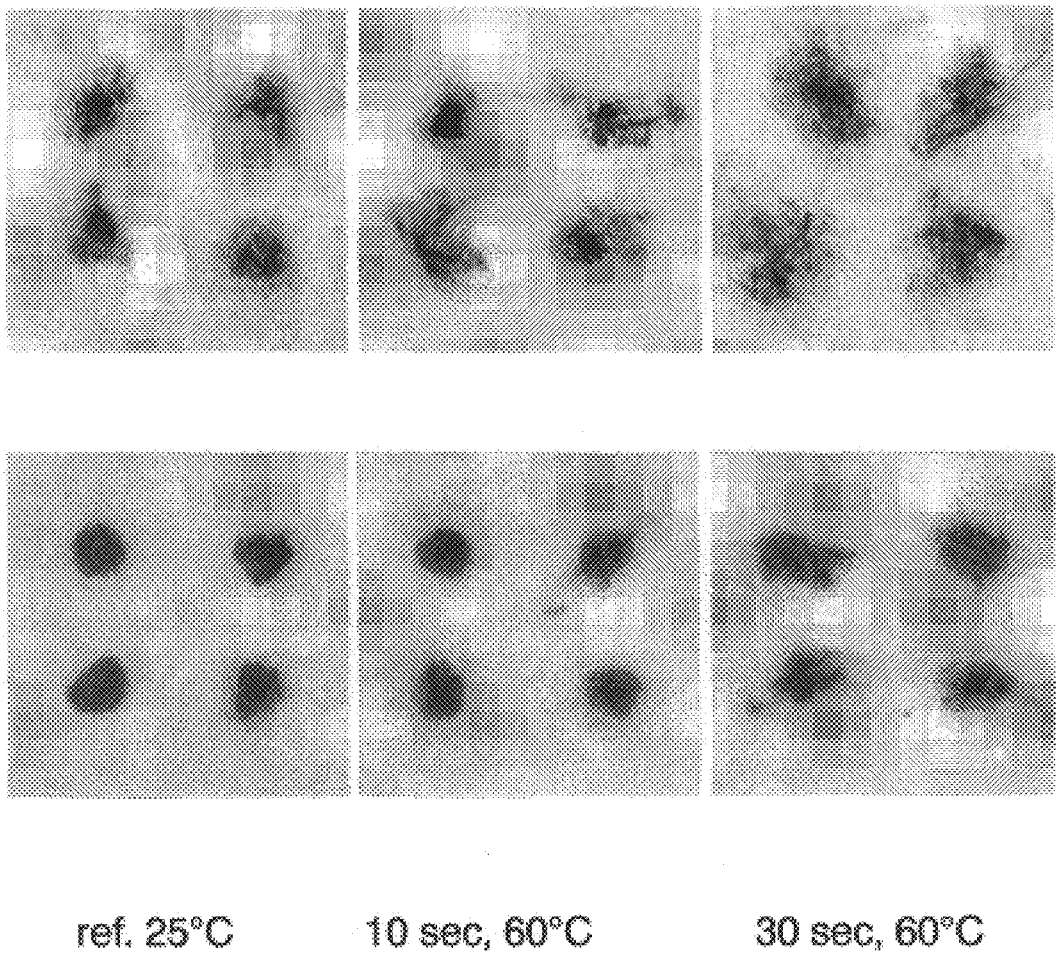
FIG. 6 shows the printed results of an ink composition with and without a gelling agent, depending on various after-treatment conditions.

FIG. 6 shows the effect of an after-treatment of a printed image on image quality. For this purpose, images of ink compositions I (Table 5) and I' (Table 6) were printed with a piezo printer, the print head of which was heated to 135° C. The diameter of the ejected ink drops was approximately 35 µm. The drops were printed on paper (Océ Red Label) with a temperature of 25° C. The images in each case consist of four ink drops. After the printing of the images they were exposed to various thermal after-treatments in a radiation fuser of an Océ 7050 wide-format copying machine.

The first series of three images shows the effect of thermal after-treatment on a printed image for an ink of composition I'. The first image is the reference image, i.e. the image that forms when the drops are printed on a substrate at 25° C., without after-treatment. The second image is obtained with a 10 second after-treatment at a temperature of 60° C. In this treatment, the ink drops already show distinct feathering resulting in unsharp edges and a lower optical density. With a 30-second after-treatment at 60° C. these adverse effects are even more pronounced (third image).

When ink composition I is subjected to the same series of after-treatments, it has been found that they have practically no negative effect on the print quality as shown in the second series of FIG. 6. It is clear that the ink drops hardly run and accordingly there is practically no decline in optical density. The gelled ink drops, due to the relatively high viscosity, do not spread out in a direction parallel to the paper but simply penetrate the paper. As a result, the resistance to mechanical stress, such as gumming, folding and scratching of the printed ink drops, increases but the visible quality of the print is not affected.

TABLE 1

Gelling agent selection

| Agent (type) | Structural formula | Tm (°C.) | Tc (°C.) |
|---|---|---|---|
| gel-1 (mono-ester) | $H_{59}C_{29}-C(=O)-O-C_{28}H_{57}$ | 72 | 60 |
| gel-2 (di-ester) | $H_{59}C_{29}-C(=O)-O-(CH_2)_2-O-C(=O)-C_{29}H_{59}$ | 83 | 70 |
| gel-3 (di-ether-alcohol) | biphenyl-$O-CH_2-CH(OH)-CH_2-O-(CH_2)_{17}CH_3$ | 101 | 86 |
| gel-4 (diamide-ether) | $H_3C(CH_2)_3-O-(CH_2)_3-NH-C(=O)-(CH_2)_4-C(=O)-NH-(CH_2)_3-O-(CH_2)_3CH_3$ | 117 | 111 |
| gel-5 (diamide-ether) | $H_3C-O-(CH_2)_3-NH-C(=O)-(CH_2)_{10}-C(=O)-NH-(CH_2)_3-O-CH_3$ | 130 | 126 |
| gel-6 (diamide-ether) | $H_3C(CH_2)_3-O-(CH_2)_3-NH-C(=O)-(CH_2)_{10}-C(=O)-NH-(CH_2)_3-O-(CH_2)_3CH_3$ | 116 | 103 |
| gel-7 (diamide-alcohol) | $HO-(CH_2)_3-NH-C(=O)-(CH_2)_{10}-C(=O)-NH-(CH_2)_3-OH$ | 137 | 124 |
| gel-8 (diamide-alcohol) | $H_3C-CH(OH)-CH_2-NH-C(=O)-(CH_2)_{10}-C(=O)-NH-CH_2-CH(OH)-CH_3$ | 113 | 89 |
| gel-9 (diamide-alcohol) | $HO-(CH_2)_5-C(=O)-NH-(CH_2)_n-NH-C(=O)-(CH_2)_5-OH$ | 135 | 124 |
| gel-10 (diamide-alcohol) | $HO-(CH_2)_5-C(=O)-NH-(CH_2)_{12}-NH-C(=O)-(CH_2)_5-OH$ | 139 | 129 |
| gel-11 (diamide-alcohol) | $HO-(CH_2)_3-C(=O)-NH-(CH_2)_{12}-NH-C(=O)-(CH_2)_3-OH$ | 142 | 131 |
| gel-12 (diamide-alcohol) | $H_3C-CH(OH)-CH_2-C(=O)-NH-(CH_2)_{12}-NH-C(=O)-CH_2-CH(OH)-CH_3$ | 114 | 97 |
| gel-13 (diamide) | 4-methyl-1,2-phenylene bis[NH-C(=O)-(CH_2)_{16}-CH_3] | 108 | 86 |
| gel-14 (di-urethane) | $H_3C(CH_2)_5-O-C(=O)-NH-(CH_2)_6-NH-C(=O)-O-(CH_2)_5CH_3$ | 99 | 89 |
| gel-15 (di-urethane) | $H_3C(CH_2)_{17}-NH-C(=O)-O-(CH_2)_6-O-C(=O)-NH-(CH_2)_{17}CH_3$ | 117 | 101 |

TABLE 1-continued

Gelling agent selection

| Agent (type) | Structural formula | Tm (° C.) | Tc (° C.) |
|---|---|---|---|
| gel-16 (di-urethane) | $H_3C(CH_2)_{17}-NH-C(=O)-O-(CH_2)_8-O-C(=O)-NH-(CH_2)_{17}CH_3$ | 118 | 105 |
| gel-17 (di-urethane) | $H_3C(CH_2)_{17}-NH-C(=O)-O-(CH_2)_{10}-O-C(=O)-NH-(CH_2)_{17}CH_3$ | 116 | 103 |
| gel-18 (di-urethane) | $H_3C(CH_2)_{17}-NH-C(=O)-O-(CH_2)_{17}-O-C(=O)-NH-(CH_2)_{17}CH_3$ | 112 | 100 |
| gel-19 (tri-urethane) | $H_3C(CH_2)_{17}-NH-C(=O)-O-(H_2C)_2-N[(H_2C)_2-O-C(=O)-NH-(CH_2)_{17}CH_3]_2$ (with third branch $(CH_2)_2-O-C(=O)-NH-(CH_2)_{17}CH_3$) | 93 | 64 |
| gel-20 (ureum) | $H_3C(CH_2)_{17}-NH-C(=O)-NH-(CH_2)_{17}CH_3$ | 118 | 60 |
| gel-21 (ureum) | $H_3C(CH_2)_7-NH-C(=O)-NH-(CH_2)_{17}CH_3$ | 100 | 82 |
| gel-22 (di-ureum) | $H_3C(CH_2)_{17}-NH-C(=O)-NH-(CH_2)_{12}-NH-C(=O)-NH-(CH_2)_{17}CH_3$ | 163 | 148 |
| gel-23 (di-ureum) | $H_3C(CH_2)_{17}-NH-C(=O)-NH-(CH_2)_2-O-(CH_2)_2-O-(CH_2)_2-NH-C(=O)-NH-(CH_2)_{17}CH_3$ | 134 | 111 |
| gel-24 (di-ureum) | $H_3C(CH_2)_2-NH-C(=O)-NH-(CH_2)_2-O-(CH_2)_2-O-(CH_2)_2-NH-C(=O)-NH-(CH_2)_2CH_3$ | 132 | 98 |
| gel-25 (di-ureum-siloxane) | $H_3C(CH_2)_{17}-NH-C(=O)-NH-(CH_2)_3-Si(CH_3)_2-O-Si(CH_3)_2-(CH_2)_3-NH-C(=O)-NH-(CH_2)_{17}CH_3$ | 95 | 73 |

TABLE 2

Selection of crystalline materials

| No. | Formula (abbreviation) | Tm(° C.) | Tc(° C.) |
|---|---|---|---|
| A | $R-O-C(=O)-NH-(CH_2)_6-NH-C(=O)-O-R$ | | |
| 1 | R = CH$_3$O—CH$_2$—CH$_2$— (HMDI-MEG) | 77 | 48 |
| 2 | R = C$_2$H$_5$O—CH$_2$—CH$_2$— (HMDI-EEG) | 73 | 48 |
| 3 | R = C$_6$H$_{13}$— (HMDI-HA) | 100 | 84 |
| 4 | R = C$_6$H$_5$—CH$_2$—CH$_2$— (HMDI-PEA) | 132 | 98 |

TABLE 2-continued

Selection of crystalline materials

| No. | Formula (abbreviation) | Tm(° C.) | Tc(° C.) |
|---|---|---|---|
| B | [benzenesulfonamide structure: R-C6H4-SO2-NH2] | | |
| 5 | R = para CH$_3$— (p-TSA) | 142 | 108 |
| 6 | R = ortho/para (40/60) CH$_3$— (o/p-TSA) | 113 | 70 |
| 7 | R = para C$_2$H$_5$— (p-EBSA) | 112 | 86 |
| 8 | p-TSA/p-EBSA 1:1 | 108 | 83 |
| 9 | R = para n-C$_4$H$_9$— (p-BuBSA) | 101 | 64 |
| C | Alcohols | | |
| 10 | 1, 2-hexadecanediol (1, 2-HDD) | 74 | 56 |
| 11 | 1, 12-dodecanediol (1,12-DDD) | 87 | 70 |
| 12 | 4-biphenylmethanol (4-BPM) | 104 | 88 |
| 13 | 1, 4 hydrochinon bis (2-hydroxyethyl) ether (HQHE) | 109 | 84 |
| 14 | 1, 4 benzenedimethanol (1, 4 BDM) | 123 | 81 |
| 15 | 1-O-p-anisylglycerol (ANGLY) | 82 | 60 |
| 16 | phenyl 1, 2-ethaandiol (PED) | 68 | 17 |
| D | Various | | |
| 17 | trans-cyclo-hexane-1,4-dimethanol di-2-toluate (CYCLO-2T) | 97 | 62 |
| 18 | N-methyl-para-toluenesulfonamid (N-PTSA) | 81 | 15 |
| 19 | 1, 4-butanediol-di-4-toluate (1, 4-4T) | 118 | 100 |
| 20 | 1, 6-hexanediol-di-4-toluate (1, 6-4T) | 92 | 35 |

TABLE 2-continued

Selection of crystalline materials

| No. | Formula (abbreviation) | Tm(° C.) | Tc(° C.) |
|---|---|---|---|
| 21 | urethane of 2-methyl-1, 3 propanediol and n-propylisocyanate (2M-1, 3PI) | 103 | 69 |
| 22 | 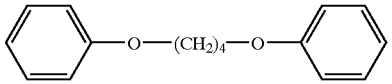 1, 4-diphenoxybutane (1, 4-DPB) | 100 | 84 |

TABLE 3a

Selection of monomer and oligomer amorphous materials

| No. | Formula (abbreviation) | Tg (° C.) |
|---|---|---|
| A | $C(CH_2-O-\overset{O}{\underset{\|}{C}}-R)_4$ | |
| 1 | R = $C_6H_5$— (PETB) | 19 |
| 2 | R = ortho $CH_3$—$C_6H_5$— (PET2T) | -2 |
| 3 | R = meta $CH_3$—$C_6H_5$— (PET3T) | 7 |
| 4 | R = para $CH_3$—$C_6H_5$— (PET4T) | 27 |
| 5 | R = meta/para (15/85) $CH_3$—$C_6H_5$— (PET3, 4T) | 22 |
| 6 | R = para $CH_3O$—$C_6H_5$— (PET-ANI) | 32 |
| B | $R-\overset{O}{\underset{\|}{C}}-O-CH_2)_3-C-CH_2-O-CH_2-C-(CH_2-O-\overset{O}{\underset{\|}{C}}-R)_3$ | |
| 7 | R = $C_6H_5$— (di-PETB) | 29 |
| 8 | R = ortho $CH_3$—$C_6H_5$ (di-PET2T) | 10 |
| 9 | R = meta $CH_3$—$C_6H_5$— (di-PET3T) | 15 |
| 10 | R = para $CH_3$—$C_6H_5$— (di-PET4T) | 37 |
| 11 | R = para $CH_3O$—$C_6H_5$— (di-PET-ANI) | 44 |
| 12 | R = $C_6H_5O$— di-PET-PC | 30 |
| C | (IPDI cyclohexane structure with two urethane groups) | |
| 13 | R = iso-$C_3H_7$— (IPDI-IPA) | 24 |
| 14 | R = $CH_3$— (IPDI-MA) | 30 |
| 15 | R = $C_2H_5$— (IPDI-EA) | 10 |
| 16 | R = $C_6H_5$—$CH_2$— (IPDI-BA) | 20 |

TABLE 3a-continued

Selection of monomer and oligomer amorphous materials

| No. | Formula (abbreviation) | Tg (° C.) |
|---|---|---|
| D | [structure: O−C(=O)−NH−cyclohexyl−CH$_2$−cyclohexyl−NH−C(=O)−O] | |
| 17 | R = C$_6$H$_5$—CH$_2$— (CMDI-BA) | 14 |
| 18 | R = C$_6$H$_5$—CH$_2$—CH$_2$— (CMDI-PEA) | 13 |
| E | [structure: O−C(=O)−NH−phenyl−CH$_2$−phenyl−NH−C(=O)−O] | |
| 19 | R = iso-C$_3$H$_7$— (MDI-IPA) | 27 |
| 20 | R = CH$_3$O—CH$_2$—CH$_2$— (MDI-MEG) | 3 |
| F | [structure: phenyl−O−CH$_2$−CH(OH)−CH$_2$−O−phenyl−C(CH$_3$)$_2$−phenyl−O−CH$_2$−CH(OH)−CH$_2$−O−phenyl] | |
| 21 | R = C$_6$H$_5$— (PBPA-PP) | 45 |
| 22 | R = C$_6$H$_{11}$— (PBPA-CHP) | 39 |
| 23 | R = tert C$_5$H$_{11}$— (PBPA-AP) | 30 |
| 24 | R = tert C$_4$H$_9$— (PBPA-BuP) | 28 |
| G | [structure: biphenyl with two O−C(=O)−R groups] | |
| 25 | R = para CH$_3$O—C$_6$H$_5$— (BIPANI) | 25 |
| 26 | R = ortho CH$_3$—C$_6$H$_5$— (BIP2T) | −4 |
| 27 | R = meta CH$_3$—C$_6$H$_5$— (BIP3T) | −1 |
| 28 | R = para CH$_3$—C$_6$H$_5$— (BIP4T) | 17 |
| 29 | R = C$_6$H$_5$O— (BIPPC) | 12 |
| H | [structure: tri-branched with cyclohexyl-NH-C(=O)-(OC$_3$H$_6$)x-O-CH$_2$ groups] | |

TABLE 3a-continued

Selection of monomer and oligomer amorphous materials

| No. | Formula (abbreviation) | Tg (° C.) |
|---|---|---|
| 30 | x ≈ 1 (GLYPOCHI) | 17 |

I: [Structure: glycerol-based core with four branches, each containing —O—(C₃H₆O)x—C(=O)—NH—cyclohexyl groups attached via —CH₂— linkers to a central quaternary carbon]

| No. | Formula (abbreviation) | Tg (° C.) |
|---|---|---|
| 31 | X ≈ 1 (PETPOCHI) | 23 |

J: [Structure: cyclohexyl—NH—C(=O)—O—CH₂—C(CH₃)(CH₂OH)—CH₂—O—CH₂—C(CH₃)(CH₂OH)—CH₂—O—C(=O)—NH—cyclohexyl]

| No. | Formula (abbreviation) | Tg (° C.) |
|---|---|---|
| 32 | (DITRIM-50CHI) | 28 |

K: [Structure: phenyl—C(=O)—NH—CH₂—CH(CH₃)—(CH₂)₃—NH—C(=O)—phenyl]

| No. | Formula (abbreviation) | Tg (° C.) |
|---|---|---|
| 33 | (BEMDAP) | 28 |

TABLE 3b

Selection of commercially available oligomer and polymer amorphous materials

| No. | Name (manufacturer) | chemical description | Tg (° C.) | Mw (g/mol) |
|---|---|---|---|---|
| 1 | Foral 85E (Hercules) | glycerol-ester of hydrogenated rosin | 37 | 1000 |
| 2 | Foralyn 110 (Hercules) | pentaerythritol-ester of hydrogenated rosin | 54 | 1300 |
| 3 | Uratak 68520 (DSM) | phenolic poly-α-methyl-styreen | 37 | 880 |
| 4 | Crystalbond 509 (Printlas) | polyethylene phthalate | 30 | 4000 |
| 5 | Dynacoll 7110 (Hüls) | copolyester | 10 | 2000 |
| 6 | Dynacoll 7130 (Hüls) | copolyester | 27 | 7100 |
| 7 | Dynacoll 7150 (Hüls) | copolyester | 46 | 6100 |
| 8 | Kunstharz AP (Hüls) | acetophenone formaldehyde condensation product | 47 | 1100 |
| 9 | Kunstharz SK (Hüls) | reduced acetophenone formaldehyde condensation product | 89 | 1350 |
| 10 | Kunstharz CA (Hüls) | cyclohexanone aldehyde condensation product | 69 | 1050 |
| 11 | Kunstharz EP-TC (Hüls) | ketone aldehyde condensation product | 28 | 750 |

TABLE 4

Meltable fraction of a selection of ink compositions

| Ink number | crystalline base material, % by weight | binder, % by weight | gelling agent, % by weight |
|---|---|---|---|
| 1 | CYCLO-2T, 69.5 | GLYPOCHI, 29.5 | gel-1, 1 |
| 2 | CYCLO-2T, 68.5 | GLYPOCHI, 29.5 | gel-1, 2 |
| 3 | CYCLO-2T, 67 | GLYPOCHI, 29 | gel-1, 4 |
| 4 | CYCLO-2T, 69.5 | GLYPOCHI, 29.7 | gel-22, 0.8 |
| 5 | CYCLO-2T, 69 | GLYPOCHI, 29.5 | gel-22, 1.5 |
| 6 | CYCLO-2T, 68 | GLYPOCHI, 29 | gel-23, 3 |

TABLE 4-continued

Meltable fraction of a selection of ink compositions

| Ink number | crystalline base material, % by weight | binder, % by weight | gelling agent, % by weight |
|---|---|---|---|
| 7 | CYCLO-2T, 67 | GLYPOCHI, 29 | gel-23, 4 |
| 8 | CYCLO-2T, 67 | GLYPOCHI, 28 | gel-21, 5 |
| 9 | CYCLO-2T, 69 | Dynacoll 7110, 29 | gel-1, 2 |
| 10 | CYCLO-2T, 68 | GLYPOCHI, 14 PETPOCHI, 14 | gel-23, 4 |
| 11 | CYCLO-2T, 67 | PBPA-AP 29 | gel-23 4 |
| 12 | CYCLO-2T, 69 | Dynacoll 7110, 14.5 PBPA-AP, 14.5 | gel-1 2 |
| 13 | CYCLO-2T, 69 | Dynacoll 7110, 14.5 GLYPOCHI, 14.5 | gel-1 2 |
| 14 | 1,6-4T 67 | GLYPOCHI, 28 | gel-21 5 |
| 15 | HMDI-MEG, 68.5 | PBPA-PP, 29 | gel-3 2.5 |
| 16 | HMDI-MEG, 67 | PBPA-PP, 28 | gel-3 5 |
| 17 | HMDI-MEG, 68 | PBPA-AP, 29 | gel-23, 3 |
| 18 | HMDI-MEG, 67 | PBPA-AP, 29 | gel-23, 4 |
| 19 | HMDI-MEG, 67 | PBPA-AP, 28 | gel-21, 5 |
| 20 | HMDI-MEG, 68.5 | PBPA-BuP, 29.5 | gel-23, 2 |
| 21 | HMDI-MEG, 67 | PBPA-BuP, 29 | gel-23, 4 |
| 22 | HMDI-MEG, 69.5 | PBPA-BuP, 29.5 | gel-2, 1 |
| 23 | HMDI-MEG, 58 | DITRIM-50CHI, 39 | gel-23, 3 |
| 24 | HMDI-MEG, 63 | PBPA-AP, 34 | gel-23, 3 |
| 25 | HMDI-MEG, 68 | Crystalbond 509, 19 GLYPOCHI, 10 | gel-23, 3 |
| 26 | HMDI-MEG, 68 | DITRIM-50CHI, 29 | gel-23, 3 |
| 27 | HMDI-MEG, 68 | Crystalbond 509, 29 | gel-23, 3 |
| 28 | HMDI-MEG, 69.5 | PBPA-PP, 30 | gel-22, 0.5 |
| 29 | HMDI-MEG, 69 | PBPA-PP, 30 | gel-22, 1 |
| 30 | HMDI-MEG, 68 | PBPA-PP, 29 | gel-23, 3 |
| 31 | 1,4-4T 67 | GLYPOCHI, 28 | gel-21, 5 |
| 32 | 2M-1,3Pl, 68 | PBPA-BuP, 29 | gel-23, 3 |

TABLE 5

Ink compositions according to the present invention.
The quantities are amounts by weight

| | Ink I | ink II | ink III |
|---|---|---|---|
| K | 58.3 HMDI-MEG | 67.6 CYCLO-2T | 66.8 HMDI-MEG |
| A | 38.1 DITRIM-50CHI | 28.8 GLYPOCHI | 28.6 PBPA-BuP |
| G | 3 Gel-23 | 2 Gel-1 | 4 Gel-23 |
| KI | 0.5 Macrolex Rot | 1.5 Orasol Blau | 0.5 Macrolex Rot |
| V | 0.1 BYK 307 | 0.1 BYK 307 | 0.1 BYK 307 |

TABLE 6

Ink compositions for comparison. The quantities are amounts by weight

| | Ink I' | ink II' | ink III' |
|---|---|---|---|
| K | 60.2 HMDI-MEG | 69 CYCLO-2T | 69.6 HMDI-MEG |
| A | 39.2 DITRIM-50CHI | 29.4 GLYPOCHI | 29.8 PBPA-BuP |
| G | — | — | — |
| KI | 0.5 Macrolex Rot | 1.5 Orasol Blau | 0.5 Macrolex Rot |
| V | 0.1 BYK 307 | 0.1 BYK 307 | 0.1 BYK 307 |

TABLE 7

Spread of an ink drop against substrate temperature

| Substrate temperature (° C.) | Relative spread ink I | Relative spread ink I' |
|---|---|---|
| 25 | 1 | 1 |
| 30 | 1.1 | 1.1 |
| 34 | 1.4 | 1.4 |
| 38 | 1.5 | 1.8 |
| 43 | 1.8 | 2.3 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An ink composition for a meltable ink usable in a printing device in which ink drops are ejected from ink ducts, said ink being a solid at room temperature and a fluid at an elevated temperature, said ink composition comprising an agent which reversibly cross-links the fluid, said agent being a gelling agent which contains a compound having a molecular weight of less than 10,000.

2. The ink composition according to claim 1, wherein the ink composition is a gel at a temperature equal to or higher than room temperature.

3. The ink composition according to claim 1, wherein the ink composition is a gel at a first temperature and is a sol at a second temperature higher than the first temperature.

4. The ink composition according to claim 1, wherein the gelling agent contains a compound having a molecular weight less than 1000.

5. The ink composition according to claim 1, wherein the gelling agent has amphiphilic properties.

6. The ink composition according to claim 1, wherein the ink composition contains less than 10% by weight of the gelling agent.

7. The ink composition according to claim 1, wherein the ink composition contains less than 5% by weight of the gelling agent.

8. The ink composition according to claim 1, wherein said ink composition is a sol at the temperature at which the ink drops are ejected from the ink ducts and a gel at a lower temperature, said lower temperature differing by at least 10° C. from the temperature at which ink drops are ejected from the ink ducts.

9. The ink composition according to claim 8, wherein said lower temperature differs by at least 20° C. from the temperature at which ink drops are ejected from the ink ducts.

10. The ink composition according to claim 1, wherein said ink composition contains a crystalline base material selected from the group consisting of trans-cyclo-hexane-1, 4-dimethanol-di-1-toluate, N-methyl-paratoluene sulphonic acid, 1,4-butanediol-di4-toluate, 1,6-hexanediol-di-4-toluate, 1,4-diphenoxybutane and a urethane based on 2-methyl-1,3-propanediol and n-propylisocyanate.

11. The ink composition according to claim 1, wherein said ink composition contains a urethane as a binder material, said urethane being derived from cyclohexylisocyanate and a polyalcohol.

12. The ink composition according to claim 11, wherein the polyalcohol is selected from the group consisting of alkoxylated glycerol, pentaerythritol and di-trimethylolpropane.

13. The ink composition according to claim 11, wherein the polyalcohol is propoxylated glycerol.

14. A method of printing a substrate, comprising transferring melted ink drops to the substrate, the latter then being subjected to after-treatment, wherein the melted ink drops is an ink composition containing a gelling agent, said gelling agent containing a compound having a molecular weight of less than 10,000.

15. The method according to claim 14, wherein the substrate is subjected to a thermal after-treatment.

* * * * *